G. DE RAM.
PHOTOGRAPHIC APPARATUS.
APPLICATION FILED MAY 6, 1918.

1,382,486. Patented June 21, 1921.

Inventor
Georges de Ram
by H. B. Willson & Co.
Attorneys

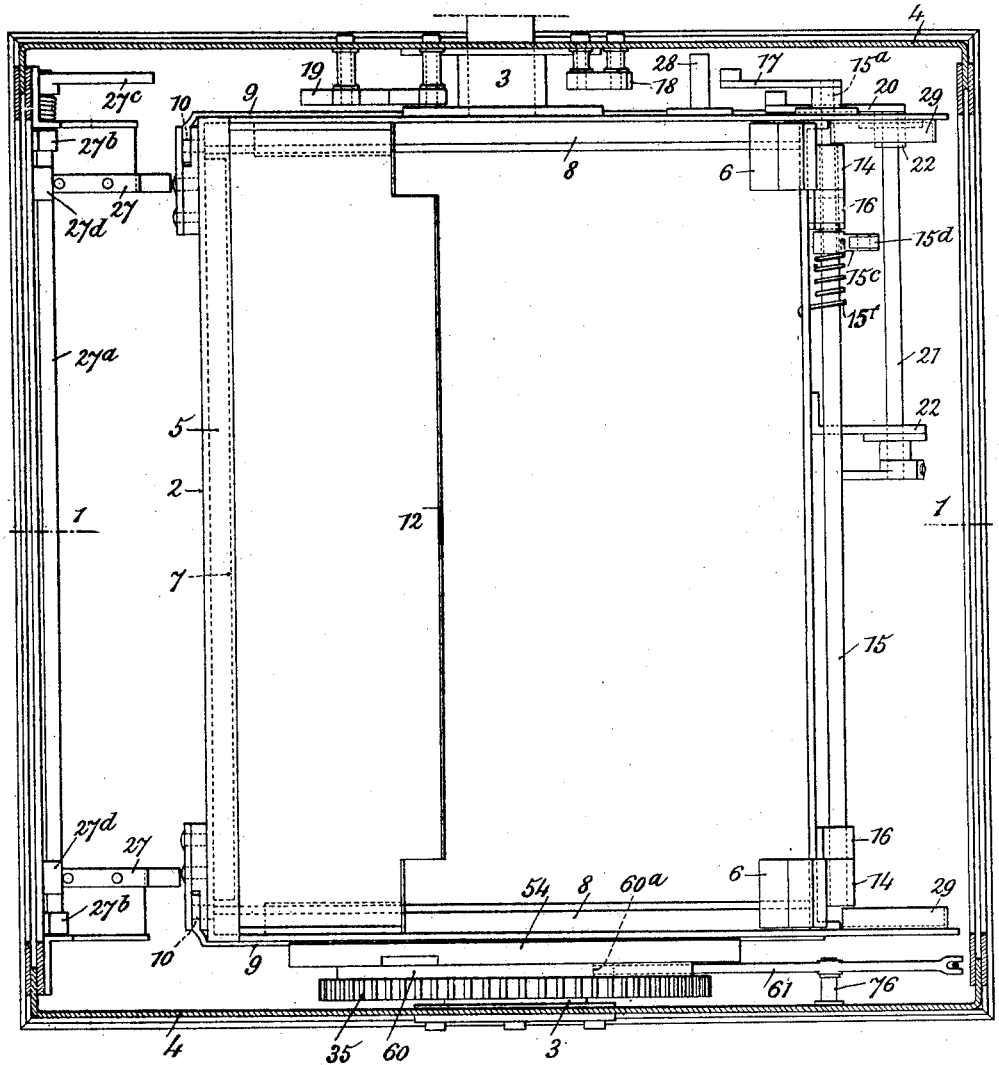

G. DE RAM.
PHOTOGRAPHIC APPARATUS.
APPLICATION FILED MAY 6, 1918.
1,382,486.
Patented June 21, 1921.
7 SHEETS—SHEET 3.
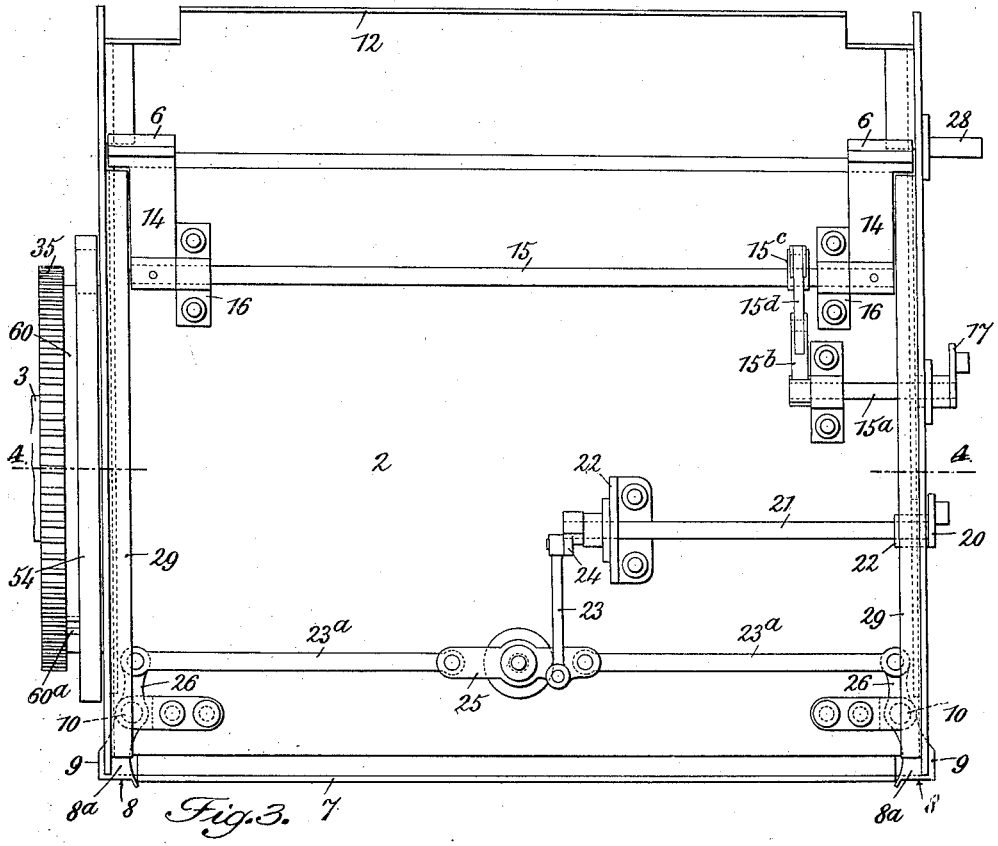
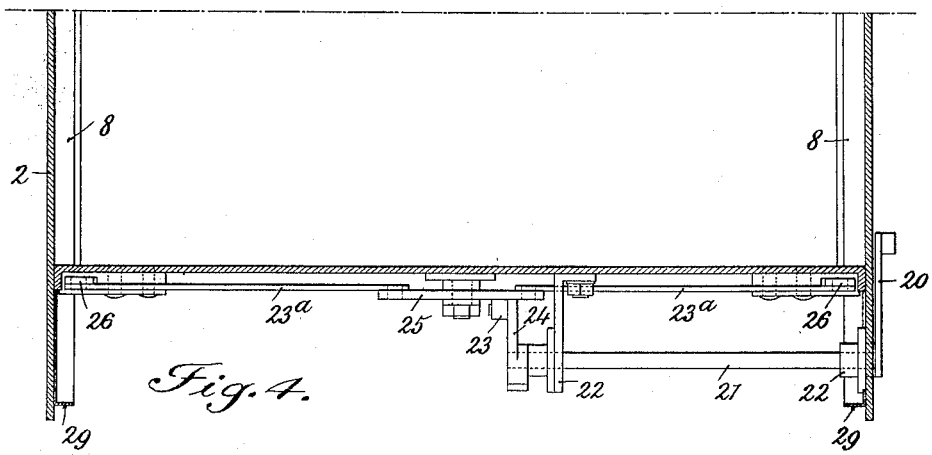
Inventor
Georges de Ram
by H. B. Willson & Co
Attorneys

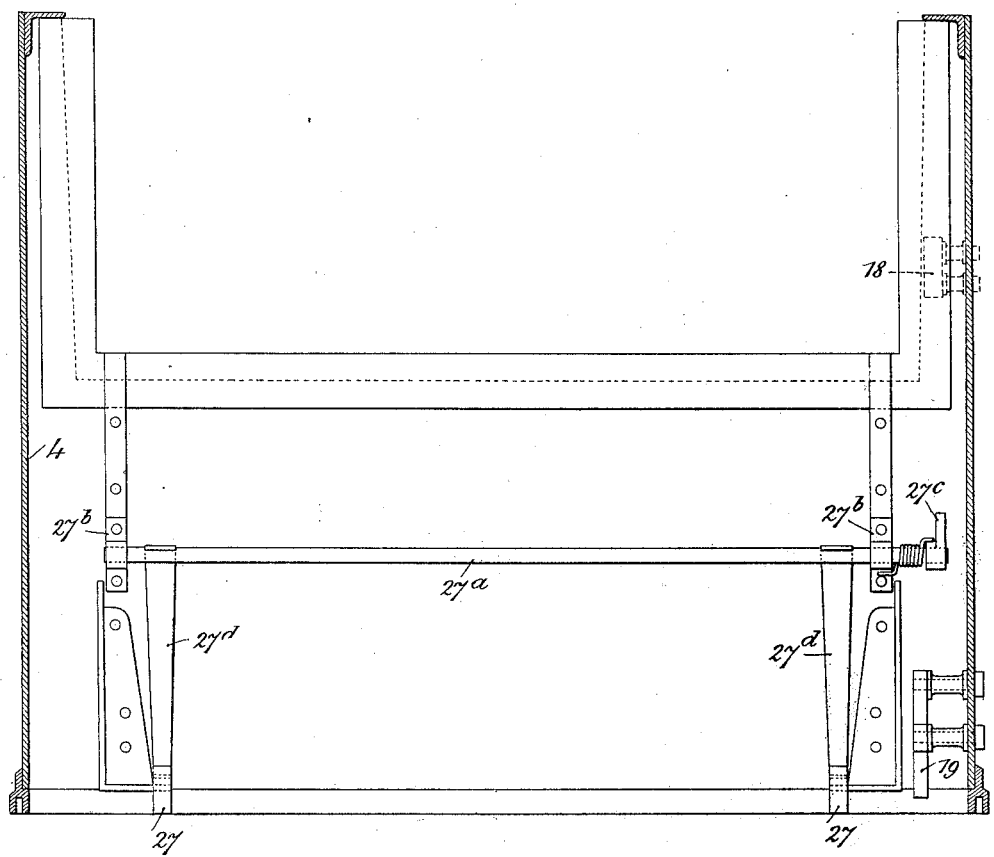

G. DE RAM.
PHOTOGRAPHIC APPARATUS.
APPLICATION FILED MAY 6, 1918.
1,382,486.
Patented June 21, 1921.
7 SHEETS—SHEET 6.
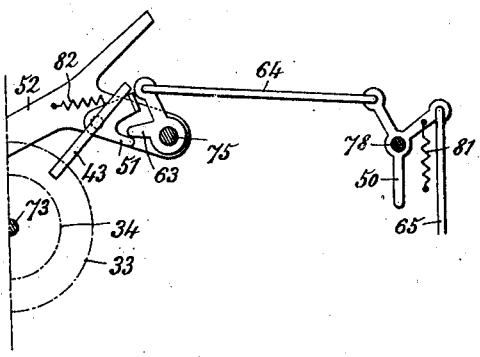
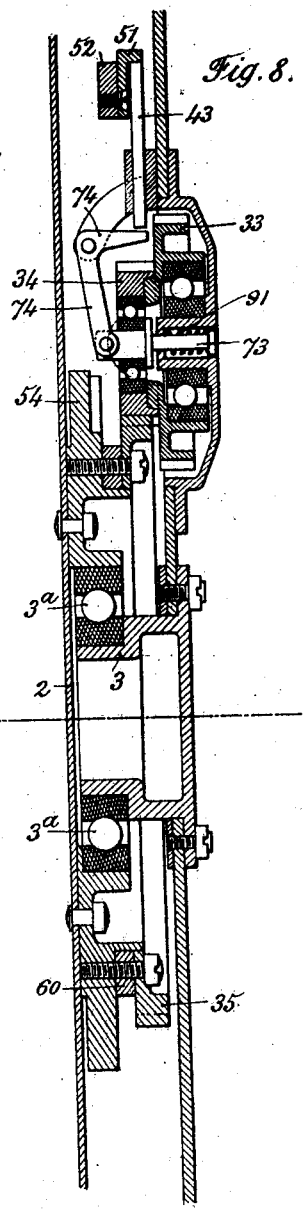
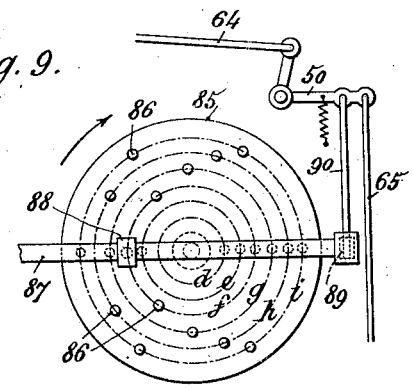
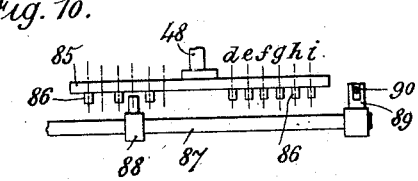
Inventor
Georges de Ram
by H. B. Willson & Co
Attorneys

G. DE RAM.
PHOTOGRAPHIC APPARATUS.
APPLICATION FILED MAY 6, 1918.

1,382,486.

Patented June 21, 1921.
7 SHEETS—SHEET 7.

Inventor
Georges de Ram
by H. B. Willson & Co
Attorneys

UNITED STATES PATENT OFFICE.

GEORGES DE RAM, OF PARIS, FRANCE.

PHOTOGRAPHIC APPARATUS.

1,382,486.  Specification of Letters Patent.  Patented June 21, 1921.

Application filed May 6, 1918. Serial No. 232,840.

*To all whom it may concern:*

Be it known that I, GEORGES DE RAM, a citizen of the Republic of France, residing at Paris, 118 Boulevard Exelmans, France, have invented new and useful Improvements in Photographic Apparatus, of which the following is a specification.

The present invention relates to improvements in cameras intended for the purpose of taking successive views at regular intervals of time, as for instance on aircraft.

Its object is to construct a camera of this kind enabling a large number of plates to be employed in a limited space and enabling these plates to be changed by a very simple operation requiring only an insignificant amount of force whatever may be the weight of plates contained in the magazine.

This invention also comprises controlling mechanism enabling the camera to be made to operate automatically at intervals of time the duration of which may be varied at will between very wide limits. This result is important for aviation, since the time that elapses between two successive exposures should vary with the speed of the aircraft with respect to the ground, its altitude, the extent to which two successive views overlap, etc.

The accompanying drawing illustrates by way of example one constructional form of a camera according to the invention, together with a modification of the device for regulating the intervals of time between successive exposures.

Fig. 2 is a sectional plan of the camera on the line 2—2 of Fig. 1, showing a plan of the magazine.

Fig. 3 is a front elevation of the magazine.

Fig. 4 is a partial sectional plan of the magazine on the line 4—4 in Fig. 3.

Fig. 5 is a sectional elevation of the camera on the line 5—5 in Fig. 1.

Fig. 7 shows in a different position certain parts of the mechanism illustrated in Fig. 6.

Fig. 8 is a partial sectional elevation on the line 8—8 in Fig. 6.

Fig. 9 is an elevation of a modification of the device that serves to vary the duration of the intervals between the exposures.

Fig. 10 is a plan corresponding to Fig. 9.

In the diagrammatic Figs. 11 to 15 the lens indicated at $a$ is assumed to be directed downward, as is appropriate in the case of a camera intended for aviation. It should however be understood that the invention can be applied to cameras operating in any position whatever.

The photographic plates $1^a$, $1^b$, $1^c$ . . . $1^n$, mounted in sheaths of the usual type, are located in a metallic magazine 2. Their sensitized sides are directed downward when the magazine is placed in the position indicated in Fig. 11.

This magazine is mounted on trunnions 3 in a box or chamber 4, which carries the lens objective $a$ and forms a camera.

Figure 1:
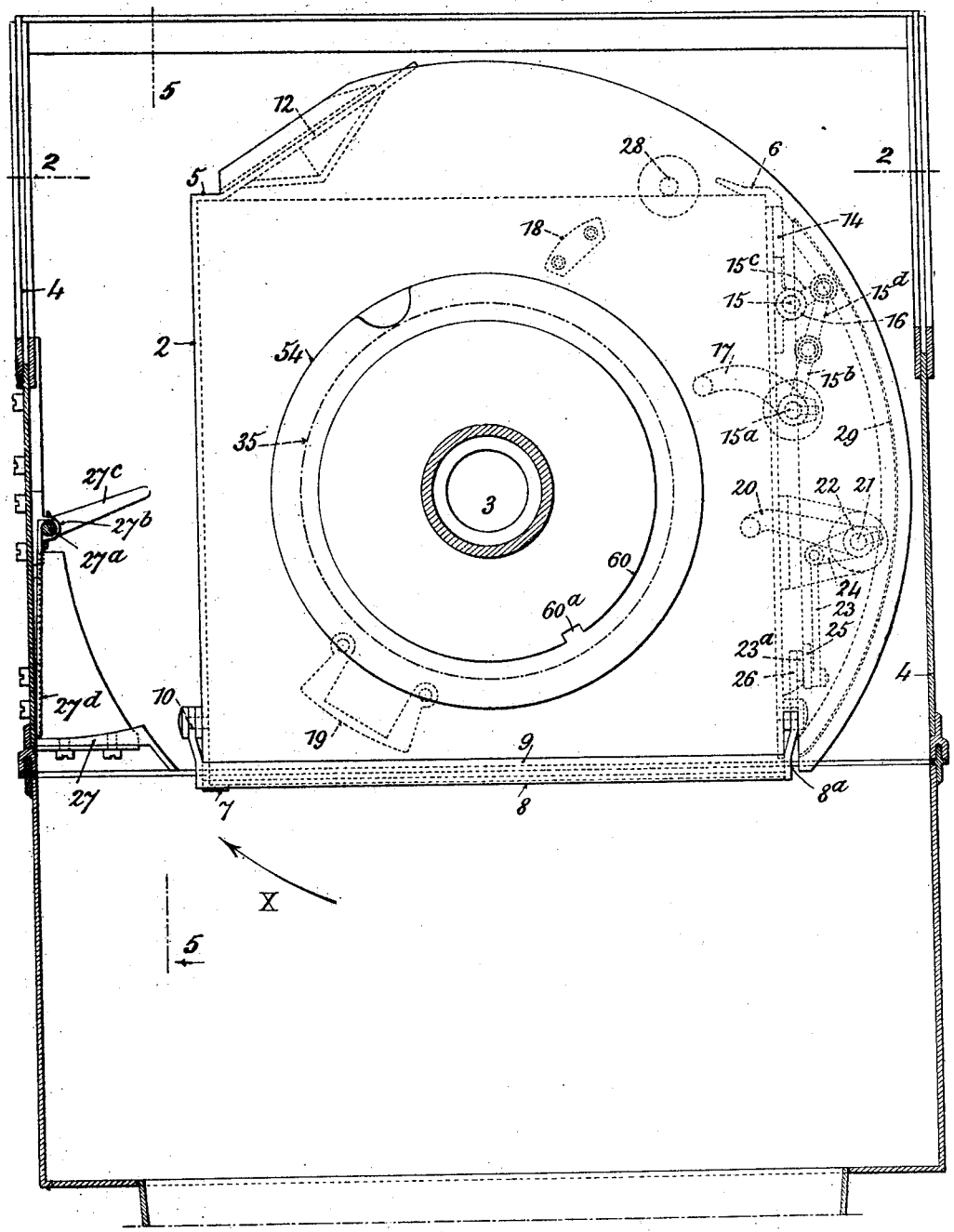
Figure 1 is a sectional elevation of the camera, on the line 1—1 of Fig. 2, showing a side elevation of the magazine.

The magazine 2 is in the form of a rectangular box the upper and lower sides of which are open. At its upper part it is provided, Figs. 1, 2 and 3, with a fixed flange 5 and movable hooks 6 and at its lower part with a fixed flange 7 and movable lateral flanges 8. The latter are virtually integral with shutters 9 pivotally mounted at 10 on the sides of the magazine and held in the position shown in Figs. 1 and 3. In this position the flanges 8 coöperate with the flange 7 to sustain the plates 1.

They are provided at the ends opposite to the flange 7 with projections or stops $8^a$ which prevent the corresponding plate 1 from sliding laterally so long as the flanges 8 are kept in the closed position.

The flange 5 is prolonged by means of an oblique guiding plate 12.

The movable hooks 6 are carried by arms 14 fixed on to a shaft 15 revolving in supports 16 mounted on the magazine in such a way that the hooks 6 can move down and outwardly. This falling backward is effected during the rotation of the magazine when an arm 17 fixed on to the shaft $15^a$ meets a cam 18 fixed into the box 4, this shaft $15^a$ being connected to the shaft 15 by an arrangement of cranks $15^b$, $15^c$ and connecting rods $15^d$.

The shutters 9 are also opened by means of a fixed cam 19, which is encountered by an arm 20, the latter being carried by a shaft 21 revolving in supports 22 fixed to the magazine and transmitting its rotary motion to the shutters through the medium of a system of links 23, 23$^a$, 23$^a$ and cranks 24, 25, 26, 26.

The box 4 also carries two fixed hooks 27 and a retaining finger or pawl 27$^a$ which revolves in bearings 27$^b$ and which is provided with a controlling finger 27$^c$ and two operating fingers 27$^d$. The magazine 2 carries a cam 28 for the purpose of actuating the finger 27$^c$, the function of which will be indicated below.

Figure 13:
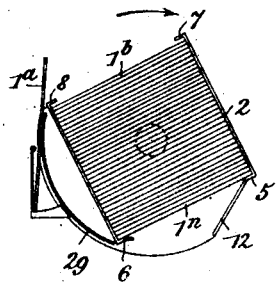

Finally the magazine is provided at the sides with cams 29 intended for the purpose of acting on the photographic plates when once they are deposited on the hooks 27, in such a way as to bring them into a vertical position as indicated in Fig. 13.

The apparatus operates in the following manner:—

Figure 11:
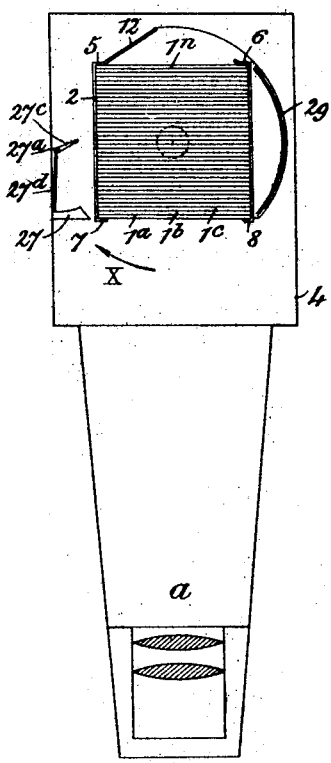
Figs. 11 to 15 are diagrams indicating various positions of the magazine.

The magazine being in the position of Fig. 11, and the first photograph having been taken, the exposed plate 1$^a$ is changed by rotating the magazine one revolution in the direction of the arrow X by means of a handle with or without the interposition of transmission by spur gearing, wire cables, or the like. (This operating mechanism is not shown.)

Figure 12:
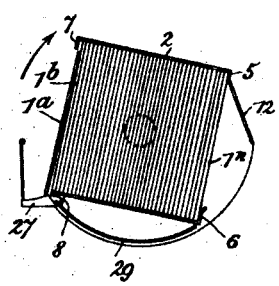

Just before the magazine reaches the position of Fig. 12 the cam 19 rotates the shutters 9 with their lateral flanges 8. The plate 1$^a$, being no longer retained by the projections 8$^a$, slides by its own weight and comes to rest on the brackets or hooks 27. The cams 29 then push back the plate 1$^a$, constraining it to turn up about its lower edge. (Fig. 13.)

The rotation continuing, the shutters 9 close, and then the fingers 27$^d$ oscillate under the action of the cam 28, pushing back the finger 27$^c$, so as to force the lower edge of the plate 1$^a$ to leave the brackets 27.

Figure 14:
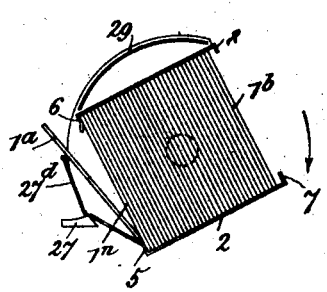

Being no longer sustained by the latter, the plate 1$^a$ then slides over the guiding plate 12 and comes into the position shown in Fig. 14.

The rotary movement continuing, the plate 1$^a$ comes to rest on the last plate 1$^n$ and the flanges 6, under the action of its own weight. At the same time the plates 1$^b$, 1$^c$ . . . 1$^n$, 1$^a$ slip downward all together and come to rest on the flanges 7 and 8.

Figure 15:
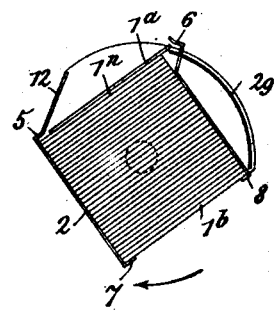

At this moment the arm 17 meets the cam 18 and thus causes the flanges 6 to open, which enables the plate 1$^a$ to rest flat against the plate 1$^n$. Then the flanges 6 close under the action of their spring 15$^f$ and push the plate 1$^a$ to the exact position that it should occupy (Fig. 15.)

The camera is then ready for the taking of a second photograph.

The magazine 2 is movable about the horizontal axis 3 by revolving on ball bearings 3$^a$.

Its rotation is produced by means of a shaft 30 driven continuously at a practically constant velocity and provided with two pinions 31 and 32. The pinion 32 gears continuously with a wheel 33, with which a wheel 34 can engage. The latter gears in its turn with a toothed ring 35 virtually integral with the magazine.

The wheel 33 is maintained in a fixed plane, while the wheel 34 is mounted on a sliding shaft 73 in such a way that it can be moved toward or away from the wheel 33 for the purpose of putting the clutch members with which the internal faces of these wheels are provided into or out of engagement. A spring 91 tends to keep these wheels in gear. The disengagement is effected by the displacement of a lever 52 about its axis of oscillation 75 in the direction of the arrow Y, this lever carrying with it, through the medium of a catch 51 a sliding rod or a push 43 which acts on one arm of a bell-crank lever 74 the other arm of which is connected to the shaft 73.

The magazine carries, concentrically with the wheel 35, on one side a locking cam 60 having a recess 60$^a$ in which a stop lever 61 oscillating about a fixed axis 76 can engage, and on the other side a cam 54 serving to actuate the lever 52, the extremity 53 of which is provided with a roller rolling over this cam. A spring 77 presses the lever 52 on to the cam 54 and consequently tends to keep the rod 43 in the position in which the lever 74 holds the wheel 34 in the disengaged position, by overcoming the action of the engaging spring, 91, so long as the roller 53 is embedded in the notch in the cam 54, that is to say, so long as the magazine is in the position of rest.

In order to regulate the duration of the periods of rest, the following device is provided. About a fixed axis 48 there can oscillate an arm or quadrant 47 provided with a toothed wheel 40. Upon the pivot 48 a wheel 42, gearing with the pinion 41, can revolve freely. It is given a tendency to rotate in the direction of the arrow Y by a spiral spring, 42$^a$, and carries two pins or studs 68 and 69, so arranged as to come into contact, one with a finger 67 adjustably fixed to the arm 47, and the other with one of the arms of a Y-shaped lever 50 oscillating about a fixed axis 78. The forked lever 50 actuates on the one hand a rod 65 controlling the locking lever 61 by means of a stop 79 and on the other hand a rod 64 controlling a bell-crank lever 63 oscillating about the axis 75 and actuating the catch 51.

The rod 65 also serves in the present constructional form to actuate the release 71 of the blind shutter of the camera, by means of a bell-crank lever 66 oscillating about a pivot 80.

The apparatus operates in the following manner:—

If the camera is considered for example at the moment when the magazine is about to be unlocked and set in rotation, (Fig. 6), it will be seen that the lock 61 is engaged in the notch 60ª of the cam 60 and still keeps the magazine stationary, that the lever 52, being still lowered, keeps the wheel 34 out of gear, and that the wheel 40 is still in gear with the pinion 31 and revolves in the direction of the arrow Y, driving in the opposite direction the wheel 42, the pin or stud 69 of which is about to come into contact with the forked lever 50.

When this contact takes place, the oscillation of the lever 50 has the effect of producing in succession the disengagement of the shutter by means of the members 65, 66, 71, the raising of the tail of the lever 61, unlocking the cam 60, and finally the rocking of the pawl 51 by means of the members 64 and 63.

By rocking in this way (Figs. 7 and 9), the pawl 51 liberates the push 43, which is moved upward by the lever 74 operated by the shaft 73 which is moved toward the right by the action of the spring 91 and engages the wheel 34 with the wheel 33. The magazine is immediately set in rotation in the direction of the arrow X.

At the commencement of this rotation the cam 54 raises the lever 52, so that the upper end of the latter pushes back the arm 47. The wheel 40 is in this way disengaged from the pinion 31 and the spur wheels 42, 41 and 40 become free to turn under the action of the spiral tension spring. The wheel 42 is in this way brought quickly back (in the direction of the arrow Y) until the spur 68 comes into contact with the finger 67.

Figure 6:
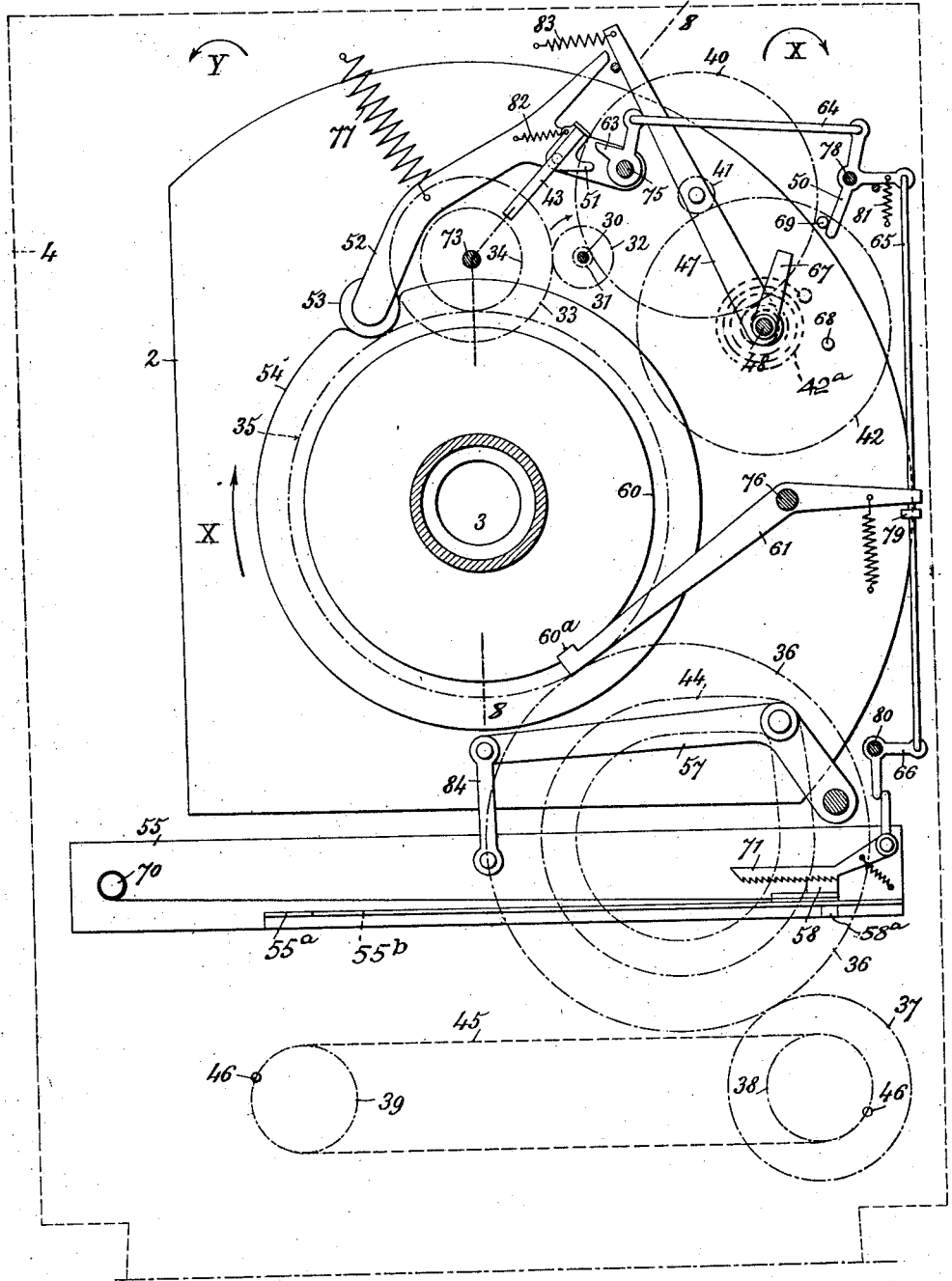
Fig. 6 shows diagrammatically a side elevation of the magazine, at the moment when it is about to be unlocked and set in rotation.

As soon as the spur 69 moves away from the lever 50, the latter resumes the position indicated in Fig. 6 under the action of its antagonistic spring 81, so that the pawl 51, under the action of its spring 82, replaces itself above the push 43 and is therefore ready to drive it downward.

At the end of a predetermined lapse of time the magazine completes its revolution and the lever 52 falls back into the notch in the cam 54. The result is that the push 43 is actuated by the pawl 51 and immediately throws the wheel 34 out of gear, which enables the magazine to be at the same time stopped by the locking lever 61. Furthermore, the lever 52 having liberated the arm 47, the latter oscillates under the action of its spring 83, and the wheel 40 is again brought into gear with the pinion 31.

From that moment the wheel 42 again rotates in the direction of the arrow X, the spur 68 moving away from the finger 67 and the spur 69 approaching the lever 50, while the magazine is kept stationary by the lock 61.

This pause period of the magazine terminates when the spur 69 again actuates the lever 50, as has been explained above. The duration of this period is proportional to the angular travel of the spur 69, starting from the position of rest of the wheel 42 until the moment when it actuates the lever 50. It can be modified between wide limits by varying the angle of the finger 67 with respect to the arm 47, which enables the travel of the spur 69 to be reduced almost to zero and to be increased almost up to 360° according to requirements.

Instead of modifying the angle of the finger 67 with respect to the arm 47 it would be possible, also for the purpose of varying the interval of time between two successive exposures, to change the position of one of the spurs 68, 69, or to employ any other equivalent means.

In the constructional form described, the photographic apparatus comprises a cam-groove 44, which is constrained to revolve with the magazine by means of a wheel 36 in gear with the wheel 35, and which serves to move vertically the shutter frame 55 by means of a lever 57 and a link 84, in such a way as to give to the magazine, at the desired time, sufficient clear space to revolve. The same vertical movement is utilized for the purpose of producing the setting of the shutter, by means of an endless chain 45 provided with driving tappets 46 and passing around chain wheels 38, 39, one of which is actuated by a wheel 37 gearing with the wheel 36. Each time the frame 55 is lowered a sliding member 58 sliding along a slotted track 55ª of this frame and connected to the spring-rotated cylinder 70 of the blind shutter, places itself in the path of the tappets 46 and is driven by one of them right under the catch 71, which holds it in the set position by means of its lugs. When the catch 71 releases the sliding member 58 the latter is returned in the vicinity of the member 70 by means of a spiral spring (not shown) mounted around said member. The slot 55ᵇ of the track 55ª terminates adjacent to the ends of the track and receives a depending abutment 58ª against which the tappets 46 abut to bring the member 58 into engagement with the member 71.

The travel of the tappets 46, at each revolution of the magazine, is invariable, but it is possible to vary the stop position of these tappets by modifying the setting of the chain wheel 38 with respect to the wheel 37. This arrangement makes it possible to regulate the stop position of the slide 58 under the catch 71 and consequently the degree of opening of the shutter.

In order to effect the stoppage of the camera all that is necessary is to keep the wheel 40 out of gear by holding the arm 47 away from its position of rest in opposition to the action of the antagonistic spring 83. Such stoppage may be produced automatically when the last plate in the magazine is changed, or by means of a counter (not shown) actuated by the rotation of the magazine and acting on the arm 47 every time this magazine has effected a predetermined number of revolutions.

In the modification indicated in Figs. 9 and 10, the mechanism controlling the camera is thrown into gear by means of a plate 85 having a continuous rotary motion at a substantially constant velocity, and carrying a series of pins or studs 86 arranged in several concentric circles, the circumferences $d$, $e$, $f$, $g$, $h$, $i$, comprising 1, 2, 3 . . . 6 projections.

Parallel to this plate is arranged a rocking shaft 87 upon which there may be fixed in various positions a slide 88 arranged in such a way as to admit of being met and lifted by the projections 86. Through the medium of a crank 89 and a connecting link 90 the oscillation of the shaft 87 is transmitted to a lever 50 fulfilling the same function as the lever 50 in the first constructional form. The slide 88, being placed facing the circumference $f$ for instance, will be raised three times per revolution of the plate 85 and will in this way produce each time the working of the shutter and the disengagement of the mechanism that controls the camera. All that is necessary in order to alter the duration of the interval of time between two successive engagements, that is to say between two successive exposures, is to alter the position of the guide 88.

It should be understood that the constructional arrangements described above and illustrated in the accompanying drawing are only given by way of example, and that they may be varied without going outside this invention, especially for the purpose of adapting them to cameras of different designs.

What I claim and desire to secure by Letters Patent of the United States is:—

1. In a photographic camera, the combination of a light tight chamber, a receptacle for photographic plates disposed within the said chamber, the said receptacle being adapted to rotate about a horizontal shaft and to be connected to a driving shaft whose direction of rotation is invariable, and having admission and delivery apertures at the ends thereof, retaining means disposed upon the said ends and adapted to retain the plates in the receptacle against the action of gravity, actuating means for opening and closing the said retaining means at determined points on the rotation of the receptacle, supporting means secured within the said light tight chamber for receiving the plates at a point where they issue out of the said delivery aperture by the simple action of gravity, and extensions provided upon said receptacle whereby the plates disposed upon the said supporting means are disengaged therefrom and allowed to slide into the said receptacle by their own weight.

2. In a camera the combination of a light-tight chamber, a plate-magazine mounted in this chamber so as to rotate about a horizontal axis, this magazine having at its opposite extremities openings for the exit and readmission respectively of the plates, and movable retaining members adapted to retain the plates in the magazine, brackets placed in the chamber for the purpose of receiving the plates falling from the magazine, and controlling means operating by the rotation of the magazine and adapted to actuate the said retaining members in such a way as to permit of the exit and readmission of the plates.

3. In a camera the combination of a magazine adapted to rotate about a horizontal axis and having at its opposite extremities openings for the exit and readmission respectively of the plates, one of the walls of the magazine having an extension extending obliquely above the readmission opening, and movable retaining members on the magazine adapted to control the passing of the plates through the said openings.

4. In a camera the combination of a rotating magazine having openings at its opposite extremities for the admission and exit of the plates, movable retaining members on the magazine for the purpose of controlling the passing of the plates, a chamber surrounding the magazine, cams fixed into this chamber and means mounted on the magazine and adapted to be actuated by the said fixed cams and to move the said retaining members.

5. In a camera the combination of a fixed box, a magazine rotating in this box, a controlling member designed to be set in rotation at a constant speed, means adapted for throwing the said controlling member alternately into and out of gear with the magazine in such a way as to make the latter rotate one revolution each time the said controlling member is thrown in gear with said magazine, and means for regulating the duration of time between each disengagement and the next engagement.

6. In a camera, the combination of a fixed box, a magazine rotating in this box, a driving gearing, a wheel virtually integral with the magazine, means for alternately throwing the said driving gearing into and out of engagement with the wheel that is virtually integral with the magazine, a wheel provided with projections, a spring tending to rotate this wheel in one direction, an oscillating lever, an intermediate wheel on this lever, this wheel gearing continually with the wheel carrying the projections, and another wheel integral with the said intermediate wheel and being capable of meshing with the said driving gearing, the said means for engaging the magazine with the said driving gearing being adapted to move the said oscillating lever and also being adapted to be actuated on the one hand by the revolving magazine and on the other hand by one of the projections on the wheel provided with projections.

7. In a camera, the combination of a fixed chamber, a magazine rotating in this chamber, a shutter in the chamber, a controlling member designed to receive a continuous non-reversing rotary movement, means adapted for throwing the said controlling member alternately into and out of gear with the magazine, means for regulating the duration of the time between each disengagement and the next engagement, and means for controlling the said shutter in agreement with the movements of the said engaging means.

In testimony that I claim the foregoing as my invention I have signed my name in presence of two subscribing witnesses.

GEORGES de RAM.

Witnesses:
CHAS. P. PRESSLY,
EUGENE WATTIER.